(12) United States Patent
Oishi et al.

(10) Patent No.: US 6,177,539 B1
(45) Date of Patent: Jan. 23, 2001

(54) ALIPHATIC POLYESTER AND PROCESS FOR THE PRODUCTION THEREOF

(75) Inventors: Akihiro Oishi, Tsukuba; Yoichi Taguchi, Tsuchiura; Ken-ichi Fujita, Tsukuba; Yoshikazu Ikeda, Tokyo; Takashi Masuda, Abiko; Yutaka Ishigami, Tokyo; Kazuo Nakayama, Ushiku; Shinichi Kinugasa, Tsukuba; Hisae Nakahara, Tokyo, all of (JP)

(73) Assignee: Secretary of Agency of Industrial Science and Technology (JP)

( * ) Notice: Under 35 U.S.C. 154(b), the term of this patent shall be extended for 0 days.

(21) Appl. No.: 09/531,431

(22) Filed: Mar. 20, 2000

(30) Foreign Application Priority Data

Mar. 31, 1999 (JP) .................................................. 11-093397

(51) Int. Cl.$^7$ .................................................. C08G 10/00
(52) U.S. Cl. ............................ 528/220; 528/225; 528/271
(58) Field of Search .................................... 528/220, 225, 528/271

(56) References Cited

U.S. PATENT DOCUMENTS 5,300,568 * 4/1994 Abe et al. .............................. 525/68

* cited by examiner

*Primary Examiner*—Samuel A. Acquah
(74) *Attorney, Agent, or Firm*—Lorusso & Loud

(57) ABSTRACT

A process of producing a polyester or copolyester, wherein at least one cyclic lactone of the following formula (I):

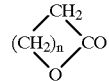

(I)

wherein n is an integer of 1–4 provided that n is not 2 when only one cyclic lactone is used, is polymerized under a pressure of at least 200 MPa in the absence of any catalyst or in the presence of a metal-free polyesterification catalyst.

7 Claims, No Drawings

ALIPHATIC POLYESTER AND PROCESS FOR THE PRODUCTION THEREOF

BACKGROUND OF THE INVENTION

This invention relates to a process for the production of a polyester and to a novel copolyester obtained by the process.

It is known to produce a polyester by ring-opening polymerization of ε-caprolactone using ethylene glycol as a polymerization initiator. One problem of this method is that the molecular weight of the polyester is only about 5,000. Use of an organometallic catalyst has led to a success in obtaining a polyester having a high molecular weight of 100,000 or more. In order to use the polyester thus obtained for application as a biodegradable polymer, it is important to remove the catalyst completely so that the polyester is free of the catalyst.

A method has been proposed to use boron trifluoride diethyl etherate as a catalyst for the production of a copolyester of β-propiolactone and γ-butyrolactone (Urakawa et al, Polymer Preprints, Japan 42, 3721(1993)). This method, however, has a problem because the number average molecular weight of the copolyester is only 840–4,250 and because the amount of γ-butyrolactone in the copolyester is 56 mole % at maximum.

SUMMARY OF THE INVENTION

It is, therefore, an object of the present invention to provide a process which can produce a high molecular weight polyester without using a metal-containing catalyst.

Another object of the present invention is to provide a copolyester having a high molecular weight.

In accomplishing the foregoing objects, there is provided in accordance with the present invention a process of producing a polyester, comprising polymerizing a cyclic lactone of the following formula (I):

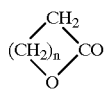

(I)

wherein n is an integer of 1, 3 or 4, under a pressure of at least 200 MPa in the absence of any catalyst or in the presence of a metal-free polyesterification catalyst.

The present invention also provides a process of producing a copolyester, comprising polymerizing a mixture containing at least two different cyclic lactones of the following formula (I):

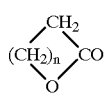

(I)

wherein n is an integer of 1–4, under a pressure of at least 200 MPa in the absence of any catalyst or in the presence of a metal-free polyesterification catalyst.

The present invention further provides a copolyester of at least one cyclic lactone of the following formula (I):

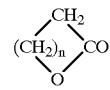

(I)

wherein n is an integer of 1–4 with a comonomer, the amount of said comonomer being 0.01 to 10 mole % based on said cyclic lactone, said comonomer being selected from the group consisting of spiculisporic acid and a spirodilactone of the following formula (II):

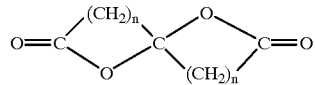

(II)

wherein n is an integer of 1–4.

The cyclic lactone of the above formula (I) used as a starting material for the production of polyesters may be β-propiolactone (n=1), γ-butyrolactone (n=2), δ-valerolactone (n=3) or ε-Caprolactone (n=4).

Other objects, features and advantages of the present invention will become apparent from the detailed description of the preferred embodiments of the invention to follow.

DETAILED DESCRIPTION OF THE PREFERRED EMBODIMENTS OF THE INVENTION

In one aspect of the present invention, a cyclic lactone of the formula (I) in which n is 1, 3 or 4 is polymerized under a pressure of at least 200 MPa, preferably at least 800 MPa in the absence of any catalyst or in the presence of a metal-free polyesterification catalyst. The upper limit of the reaction pressure is not specifically limited but is generally 2,000 MPa. The reaction temperature is generally 40–200° C., preferably 100–160° C. The reaction time is generally at least 10 hours, preferably at least 15 hours. The upper limit of the reaction time is not specifically limited but is generally 70 hours. By the above ring-opening polymerization, a polyester having a number average molecular weight of at least 10,000, preferably at least 30,000 can be obtained. The upper limit of the number average molecular weight is about 100,000.

The above reaction may be carried out in the presence of a metal-free or non-metal catalyst such as an organic acid, an organic base or a boron halide.

The organic acid may be an aliphatic or aromatic carboxylic acid having 1–10, preferably 1–4 carbon atoms. Illustrative of suitable organic acid catalysts are formic acid, acetic acid, propionic acid and benzoic acid. The acid catalyst is generally used in an amount of 0.01–10 mole %, preferably 0.01–1 mole %, based on the cyclic lactone.

The organic base may be an aliphatic or aromatic amine having 1–20, preferably 2–10 carbon atoms. Illustrative of suitable organic base catalysts are triethylamine, DBN (1,5-diazabicyclo[4,3,0]-5-nonene) and DBU (1,8-diazabicyclo[5,4,0]-7-undecene). The organic base catalyst is generally used in an amount of 0.01–10 mole %, preferably 0.01–1 mole %, based on the cyclic lactone.

The boron halide is preferably boron fluoride such as boron trifluoride and is generally used in an amount of 0.01–5 mole, preferably 0.01–1 mole, based on the cyclic lactone.

The non-metal polyesterification catalyst may be used in conjunction with an organic solvent such as an ether, a hydrocarbon, dichloromethane or toluene.

In another aspect of the present invention, a mixture containing at least two different cyclic lactones of the following formula (I):

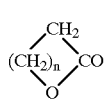

(I)

wherein n is an integer of 1–4, is polymerized under a pressure of at least 200 MPa, preferably at least 800 MPa, in the absence of any catalyst or in the presence of a metal-free polyesterification catalyst. The upper limit of the reaction pressure is not specifically limited but is generally 2,000 MPa. The reaction temperature is generally 40–200° C., preferably 100–160° C. The reaction time is generally at least 10 hours, preferably at least 15 hours. The upper limit of the reaction time is not specifically limited but is generally 70 hours. By the above ring-opening polymerization, a polyester having a number average molecular weight of at least 10,000, preferably at least 30,000 can be obtained. The upper limit of the number average molecular weight is about 100,000. The above reaction may be carried out in the presence of a metal-free or non-metal catalyst. The catalyst described above in connection with the first aspect of the present invention may be used.

In the above-described first and second aspects of the present invention, a comonomer may be incorporated into the system in an amount of 0.01 to 10 mole % based on a total mole of the cyclic lactones. The comonomer may be a polycarboxylic acid having an alkyl side chain or a precursor thereof or a spirodilactone of the following formula (II):

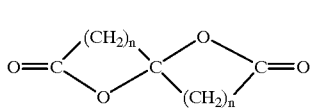

(II)

wherein n is an integer of 1–4.

Examples of the polycarboxylic acid having an alkyl side chain or a precursor thereof include spiculisporic acid and agaricic acid. By reacting the cyclic lactone or a mixture of lactones with the polycarboxylic acid, a copolyester having a number average molecular weight of at least 5,000, preferably at least 10,000 can be obtained. The upper limit of the number average molecular weight is about 100,000.

By reacting the cyclic lactone or a mixture of lactones with the spirodilactone, a copolyester having a number average molecular weight of at least 5,000, preferably at least 10,000 can be obtained. The upper limit of the number average molecular weight is about 100,000.

The following examples will further illustrate the present invention. The melting point herein is measured by DSC (differential scanning calorimetry) method, the molecular weight is measured by GPC (gel permeation chromatography) method using polystyrene as a standard, and the absolute molecular weight is determined by the MALLLS method.

EXAMPLE 1

ε-Caprolactone (13.8 g) was charged in a polytetrafluoroethylene tube and heated at a temperature of 160° C. and a pressure of 800 MPa for 20 hours. The reaction mixture was mixed with hot methanol and the liquid phase was removed by decantation. The mixing and decantation procedures were repeated once more. The residue was then dried under vacuum to obtain 13.6 g of a polyester (yield: 98% based on ε-caprolactone). The polyester thus obtained had a melting point of 62° C., a number average molecular weight (Mn) of 51,600, a weight average molecular weight (Mw) of 75,800 and Mw/Mn ratio of 1.47. In accordance with the MALLS method, the number average molecular weight (Mn) of the polyester was 18,500, the weight average molecular weight (Mw) was 37,700 and Mw/Mn was 1.99.

EXAMPLE 2

δ-Valerolactone (4.01 g) was charged in a polytetrafluoroethylene tube and heated at a temperature of 160° C. and a pressure of 800 MPa for 20 hours. The reaction mixture was mixed with hot methanol and the liquid phase was removed by decantation. The mixing and decantation procedures were repeated once more. The residue was then dried under vacuum to obtain 4.01 g of a polyester (yield: 100% based on δ-valerolactone).

The polyester thus obtained had a melting point of 60° C., a number average molecular weight (Mn) of 31,100, a weight average molecular weight (Mw) of 48,900 and Mw/Mn ratio of 1.57.

EXAMPLE 3

β-Propiolactone (1.45 g) was charged in a polytetrafluoroethylene tube and heated at a temperature of 100° C. and a pressure of 1.2 GPa for 20 hours. The reaction mixture was mixed with hot methanol and the liquid phase was removed by decantation. The mixing and decantation procedures were repeated once more. The residue was then dried under vacuum to obtain 1.42 g of a polyester (yield: 98% based on β-propiolactone).

The polyester thus obtained had a melting point of 69° C., a number average molecular weight (Mn) of 86,600, a weight average molecular weight (Mw) of 120,000 and Mw/Mn ratio of 1.39. In accordance with the MALLS method, the number average molecular weight (Mn) of the polyester was 30,700, the weight average molecular weight (Mw) was 77,200 and Mw/Mn was 2.52.

EXAMPLE 4

ε-Caprolactone (2.06 g) and δ-valerolactone (0.20 g) (molar ratio of the former lactone to the latter lactone was 9:1) were charged in a polytetrafluoroethylene tube and heated at a temperature of 160° C. and a pressure of 800 MPa for 20 hours. The reaction mixture was mixed with hot methanol and the liquid phase was removed by decantation. The mixing and decantation procedures were repeated once more. The residue was then dried under vacuum to obtain 2.15 g of a polyester (yield: 95% based on the lactones).

The polyester thus obtained had a number average molecular weight (Mn) of 45,500, a weight average molecular weight (Mw) of 63,900 and Mw/Mn ratio of 1.40.

EXAMPLE 5

ε-Caprolactone (1.15 g) and δ-valerolactone (1.01 g) (molar ratio of the former lactone to the latter lactone was 1:1) were charged in a polytetrafluoroethylene tube and heated at a temperature of 160° C. and a pressure of 800 MPa for 20 hours. The reaction mixture was mixed with hot methanol and the liquid phase was removed by decantation.

The mixing and decantation procedures were repeated once more. The residue was then dried under vacuum to obtain 2.04 g of a polyester (yield: 95% based on the lactones).

The polyester thus obtained had a number average molecular weight (Mn) of 26,100, a weight average molecular weight (Mw) of 33,400 and Mw/Mn ratio of 1.28.

EXAMPLE 6

γ-Butyrolactone (0.52 g) and ε-caprolactone (1.57 g) and boron trifluoride ethyl ether (0.006 g) were charged in a polytetrafluoroethylene tube and heated at a temperature of 130° C. and a pressure of 1.25 GPa for 20 hours. The reaction mixture was washed with ethyl ether. The residue was then dried under vacuum to obtain 1.79 g of a polyester (yield: 85% based on the lactones).

The polyester thus obtained had a number average molecular weight (Mn) of 31,700, a weight average molecular weight (Mw) of 41,300 and Mw/Mn ratio of 1.30.

EXAMPLE 7

γ-Butyrolactone (0.62 g) and δ-valerolactone (1.41 g) and boron trifluoride ethyl ether (0.006 g) were charged in a polytetrafluoroethylene tube and heated at a temperature of 130° C. and a pressure of 1.25 GPa for 20 hours. The reaction mixture was washed with ethyl ether. The residue was then dried under vacuum to obtain 1.54 g of a polyester (yield: 76% based on the lactones).

The polyester thus obtained had a melting point of 65° C., a number average molecular weight (Mn) of 14,600, a weight average molecular weight (Mw) of 25,500 and Mw/Mn ratio of 1.75.

EXAMPLE 8

δ-Valerolactone (2.01 g) and triethylamine (0.007 g) were charged in a polytetrafluoroethylene tube and heated at a temperature of 160° C. and a pressure of 400 MPa for 20 hours. The reaction mixture was mixed with hot methanol and the liquid phase was removed by decantation. The mixing and decantation procedures were repeated once more. The residue was then dried under vacuum to obtain 1.92 g of a polyester (yield: 96% based on δ-valerolactone).

The polyester thus obtained had a number average molecular weight (Mn) of 26,000, a weight average molecular weight (Mw) of 38,400 and Mw/Mn ratio of 1.48.

EXAMPLE 9

ε-Caprolactone (2.17 g) and spiculisporic acid (0.33 g; 11 mole % based on the lactone) were charged in a polytetrafluoroethylene tube and heated at a temperature of 160° C. and a pressure of 800 MPa for 20 hours. The reaction mixture was mixed with hot methanol and the liquid phase was removed by decantation. The mixing and decantation procedures were repeated once more. The residue was then dried under vacuum to obtain 1.86 g of a polyester (yield: 74%).

The polyester thus obtained had a number average molecular weight (Mn) of 6,500, a weight average molecular weight (Mw) of 12,000 and Mw/Mn ratio of 1.84.

EXAMPLE 10

ε-Caprolactone (2.29 g), 1,4-dioxaspiro[4.4]nonane-2,7-dione (0.34 g; 0.5 mole % based on the lactone) and triethylamine (0.002 g) were charged in a polytetrafluoroethylene tube and heated at a temperature of 160° C. and a pressure of 800 MPa for 20 hours. The reaction mixture was mixed with hot methanol and the liquid phase was removed by decantation. The mixing and decantation procedures were repeated once more. The residue was then dried under vacuum to obtain 2.06 g of a polyester (yield: 90%).

The polyester thus obtained had a number average molecular weight (Mn) of 23,700, a weight average molecular weight (Mw) of 33,600 and Mw/Mn ratio of 1.39. In accordance with the MALLS method, the number average molecular weight (Mn) of the polyester was 21,800, the weight average molecular weight (Mw) was 31,500 and Mw/Mn was 1.45.

What is claimed is:

1. A process of producing a polyester, comprising polymerizing a cyclic lactone of the following formula (I):

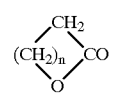

(I)

wherein n is an integer of 1, 3 or 4, under a pressure of at least 200 MPa in the absence of any catalyst or in the presence of a metal-free polyesterification catalyst.

2. A process as claimed in claim 1, wherein said polymerization is performed in the presence of 0.01 to 10 mole %, based on said cyclic lactone, of a polycarboxylic acid having an alkyl side chain or a precursor thereof.

3. A process as claimed in claim 1, wherein said polymerization is performed in the presence of 0.01 to 10 mole %, based on said cyclic lactone, of a spirodilactone of the following formula (II):

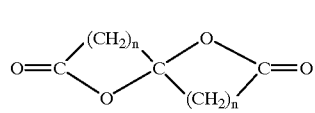

(II)

wherein n is an integer of 1–4.

4. A process of producing a copolyester, comprising polymerizing a mixture containing at least two different cyclic lactones of the following formula (I):

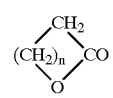

(I)

wherein n is an integer of 1–4, under a pressure of at least 200 MPa in the absence of any catalyst or in the presence of a metal-free polyesterification catalyst.

5. A process as claimed in claim 4, wherein said polymerization is performed in the presence of 0.01 to 10 mole %, based on said cyclic lactone, of a polycarboxylic acid having an alkyl side chain or a precursor thereof.

6. A process as claimed in claim 4, wherein said polymerization is performed in the presence of 0.01 to 10 mole %, based on said cyclic lactone, of a spirodilactone of the following formula (II):

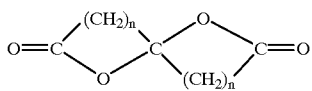
(II)

wherein n is an integer of 1–4.

7. A copolyester of at least one cyclic lactone of the following formula (I):

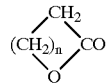
(I)

wherein n is an integer of 1–4 with a comonomer, the amount of said comonomer being 0.01 to 10 mole % based on said cyclic lactone, said comonomer being selected from the group consisting of spiculisporic acid and a spirodilactone of the following formula (II):

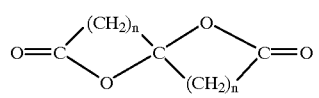
(II)

wherein n is an integer of 1–4.

* * * * *